United States Patent Office 2,982,785
Patented May 2, 1961

2,982,785
CESIUM RECOVERY

Theodore R. McKenzie, Pasco, and Wallace W. Schulz, Richland, Wash., assignors to the United States of America as represented by the United States Atomic Energy Commission No Drawing. Filed Jan. 7, 1959, Ser. No. 785,539

3 Claims. (Cl. 260—606.5)

This invention deals with a process of recovering cesium values from aqueous solutions and in particular from waste liquids obtained in the processing of nitric acid solutions of neutron-irradiated uranium for the recovery of uranium and plutonium.

Cesium is one of the predominant fission products present in the waste solutions just described, and the preponderant radioactive cesium isotope is $Cs^{137}$. Cesium 137 is a gamma and beta emitter and, on account of its comparatively long half-life (30 years), it is a useful source for beta and gamma rays of rather constant strength. Compounds of $Cs^{137}$ are being used for food and drug sterilization, for the polymerization of organic hydrocarbons, for the production of high-voltage, low-current sources (atomic batteries), for teletherapy and for radiography.

Apart from the recovery of cesium for these uses, it is also necessary for health purposes to remove the highly radioactive cesium from the waste solutions before discharging the latter to the ground.

It is an object of this invention to provide a process for the recovery of cesium values from aqueous solutions which is simple and which does not require any special equipment.

It is another object of this invention to provide a process for the recovery of cesium values from aqueous solutions which requires only small volumes of reagents so that comparatively little shielding is necessary.

It is also an object of this invention to provide a process for the recovery of cesium values from aqueous solutions that contain salts other than cesium in high concentrations and the cesium in radically lower concentrations.

It is finally also an object of this invention to provide a process for the recovery of cesium values from aqueous solutions which can be carried out from alkaline as well as from acid solutions.

These objects are accomplished by adding sodium tetraphenyl boron $(C_6H_5)_4BNa$, in the form of a solution in an organic substantially water-immiscible solvent to the aqueous cesium-containing solution whereby an organic extract phase containing cesium tetraphenyl boron forms and then separating the extract phase from the aqueous raffinate.

While a great number of organic solvents are suitable for the process of this invention and within its scope, hexone has given the best results. The aqueous solution has preferably a pH value within the range of from 2 to 13. The organic extract phase, after separation from the raffinate, may be processed for cesium concentration and/or conversion of the compound to a radiation-stable compound, such as the chloride. Processes for concentration and conversion to the chloride are known to those skilled in the art and not part of this invention.

In the following, two examples are given to illustrate the process of this invention.

Example I

An aqueous solution 2.5 M in sodium nitrate, having a pH value of 2 and containing cesium in a concentration of 5260 μc./gal. was extracted with a 0.1 M solution of sodium tetraphenyl boron hexone. Two extraction steps were carried out, each time using the same volume of the organic extractant mixture as that of the aqueous solution to be extracted. The distribution coefficients (organic:aqueous) for cesium were 0.31 and 0.33, respectively, for the two extraction steps, which amounted to a total cesium extraction of about 43%. Of course, a further repetition of the extraction would have brought about additional cesium extraction.

One extraction was carried out with the same aqueous solution as used above and under the same conditions, also using an equal volume of hexone, but this time with hexone without sodium tetraphenyl boron. The distribution coefficient in this case was 0.006, only 0.6% of the cesium being extracted into the hexone.

Example II illustrates the extraction from an alkaline solution.

Example II

A solution was used that had been obtained by dissolving the aluminum jacket of a fuel element of neutron-irradiated uranium with a solution containing a mixture of sodium nitrate and sodium hydroxide. The solution was 1.2 M in $NaAlO_2$, 1.0 M in NaOH, 0.6 M in $NaNO_3$, 0.9 M in $NaNO_2$, and 0.02 M in $Na_2SiO_3$; its pH value was 13. The cesium concentration in the solution was 0.88 μc./ml. This solution was contacted with one equal volume of a 0.1 M solution of sodium tetraphenyl boron in hexone. A distribution coefficient (organic:aqueous) of 0.85 was obtained.

The process of this invention can be carried out by any means known to those skilled in the art. For instance, for the extraction a continuous or a batch process can be used; countercurrent operation in an extraction column is the preferred method.

It will be understood that this invention is not to be limited to the details given herein but that it may be modified within the scope of the appended claims.

What is claimed is:

1. A process of separating cesium values from an aqueous solution, comprising adding a sodium tetraphenyl boron solution in hexone to the cesium solution whereby cesium tetraphenyl boron is formed and taken up in a hexone phase, and separating the hexone phase from an aqueous raffinate.

2. The process of claim 1 wherein the aqueous solution has a pH value of from 2 to 13.

3. The process of claim 1 wherein the hexone contains the sodium tetraphenyl boron in a concentration of about 0.1 M.

References Cited in the file of this patent

UNITED STATES PATENTS 2,435,314    Kokatnur _____ Feb. 3, 1948

FOREIGN PATENTS 705,719    Great Britain _____ Mar. 17, 1954